(12) United States Patent
Wang

(10) Patent No.: US 7,472,923 B2
(45) Date of Patent: Jan. 6, 2009

(54) ASSISTANT STAND MECHANISM OF A CART FOR PEOPLE TO RIDE ON

(75) Inventor: Arthur Wang, Taipei (TW)

(73) Assignee: Freerider Corp., Kaohsiung (TW)

( * ) Notice: Subject to any disclaimer, the term of this patent is extended or adjusted under 35 U.S.C. 154(b) by 444 days.

(21) Appl. No.: 11/335,651

(22) Filed: Jan. 20, 2006

(65) Prior Publication Data

US 2006/0175780 A1 Aug. 10, 2006

(30) Foreign Application Priority Data

Feb. 1, 2005 (TW) .............................. 94201800 U

(51) Int. Cl.
*B60B 11/10* (2006.01)
(52) U.S. Cl. .................. 280/767; 280/762; 180/907; 180/908
(58) Field of Classification Search ............... 180/907, 180/908; 280/762, 767, DIG. 4, DIG. 5, 280/DIG. 6, DIG. 10
See application file for complete search history.

(56) References Cited

U.S. PATENT DOCUMENTS

| | | | | |
|---|---|---|---|---|
| 1,594,687 A | * | 8/1926 | Pelton ........................ | 180/313 |
| 4,042,054 A | * | 8/1977 | Ward .......................... | 180/60 |
| 4,770,440 A | * | 9/1988 | Lander ....................... | 280/760 |
| 5,328,000 A | * | 7/1994 | Rutter et al. ............... | 188/1.12 |
| 5,526,916 A | * | 6/1996 | Amdahl et al. .............. | 194/211 |
| 5,566,788 A | * | 10/1996 | Smith et al. ................ | 188/1.12 |
| 6,299,195 B1 | * | 10/2001 | Chan .......................... | 280/651 |

* cited by examiner

*Primary Examiner*—Christopher P Ellis
*Assistant Examiner*—Jacob Meyer
(74) *Attorney, Agent, or Firm*—Rosenberg, Klein & Lee

(57) ABSTRACT

A cart has an assistant stand mechanism, which includes two first casters, a pair of metallic angle plates, a support rod, and a second caster with a brake; each of the first casters is fitted to one of two rear lateral straight parts of a chassis; the metallic angle plates are each screwed onto a respective one of the rear lateral straight parts of the chassis; the support rod is secured to the metallic angle plates at two ends such that it crosses the cart, and is normally perpendicular to the ground where the cart stands; the second caster is fitted to the support rod; further, there are two sloping rods, each connected to the support rod at one end, and connected to a corresponding metallic angle plate at the other end; thus, the cart can stand on the casters with the chassis in upright position.

7 Claims, 4 Drawing Sheets

ASSISTANT STAND MECHANISM OF A CART FOR PEOPLE TO RIDE ON

BACKGROUND OF THE INVENTION

1. Field of the Invention

The present invention relates to an assistant stand mechanism of a cart for people to ride on, more particularly one, which will support the cart and allow the cart to move when the chassis of the cart is in upright position, thus making the cart easy to repair and maintain as well as occupying less area when not in use.

2. Brief Description of the Prior Art

Currently existing carts, which are provided for the elderly and leg-handicapped to ride on to make short distance movement, can only stand on the ground with their chassises in horizontal position. Such carts are very popular because they are easy to use. And, such carts come with various sizes and lengths to suit eastern and western people who have significantly different body sizes and heights. With nationals' income increasing, the number of people is increasing who get outdoors and participate in recreational activities. And, the proportion of the elderly population is increasing with improvement of life quality and advancement of medical science. Therefore, rental carts are available for the elderly and leg-handicapped people in airports, tour spots, and resorts.

However, because currently existing carts can only stand and move on the ground with their chassises in horizontal position, in which position the carts will occupy relatively much area, it is a difficult task to arrange such rental carts in a relatively limited area when the carts aren't in use. There is no way to reduce the area occupied by rental carts in a business premise except for stacking the carts, which is a relatively labor-consuming task because such carts are relatively heavy.

SUMMARY OF THE INVENTION

It is a main object of the invention to provide an assistant stand mechanism to a cart in order to overcome the above-mentioned problems. The assistant stand mechanism of the present invention includes two first casters, a pair of metallic angle plates, a support rod, and a second caster with a brake. The first casters are fitted to respective rear lateral straight parts of a chassis. The metallic angle plates are each screwed onto one of the rear lateral straight parts of the chassis. The support rod is secured to the metallic angle plates at two ends such that it crosses the cart, and is normally perpendicular to the ground where the cart stands. The second caster is fitted to the support rod. There are two sloping rods, each connected to the support rod at one end, and connected to a corresponding metallic angle plate at the other end. Therefore, the cart can stand on the casters with its chassis in upright position, easy to repair and maintain as well as occupying less area when not in use.

BRIEF DESCRIPTION OF THE DRAWINGS

The present invention will be better understood by referring to the accompanying drawings, wherein.

DETAILED DESCRIPTION OF THE PREFERRED EMBODIMENTS

Figure 1:
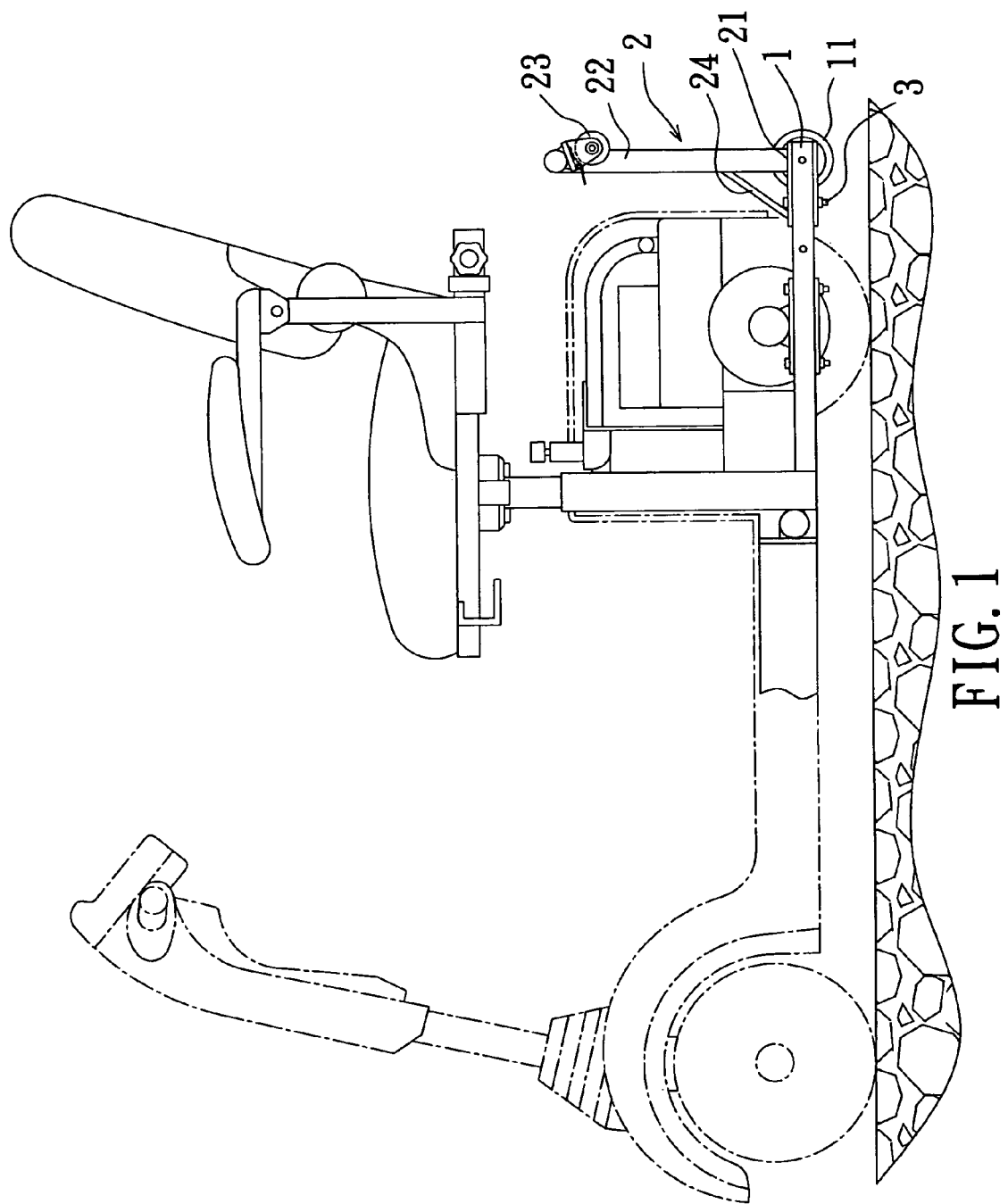
FIG. 1 is a side view of the cart for people to ride on according to the present invention.
Figure 2:
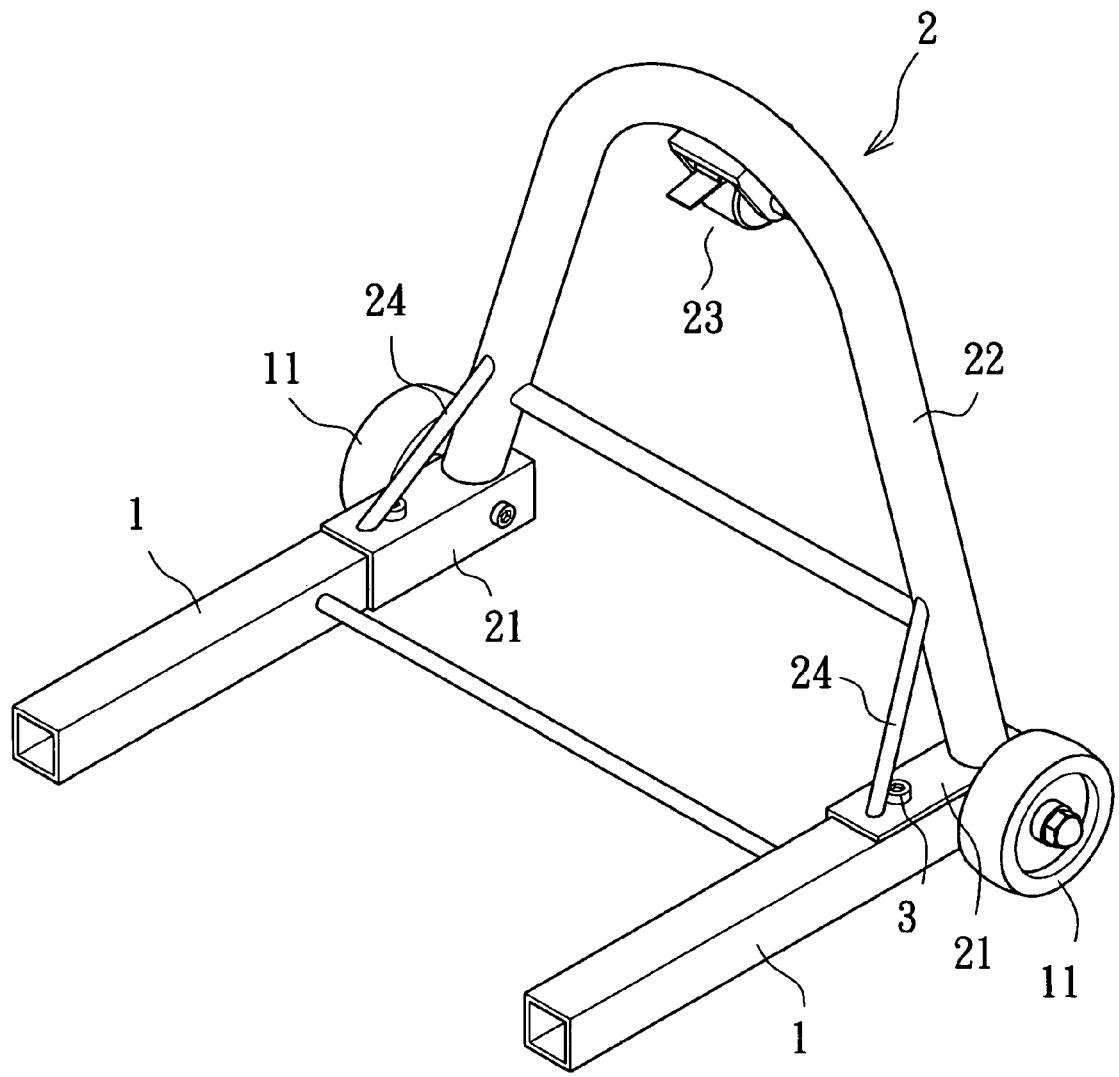
FIG. 2 is a partial perspective view of the present invention.
Figure 3:
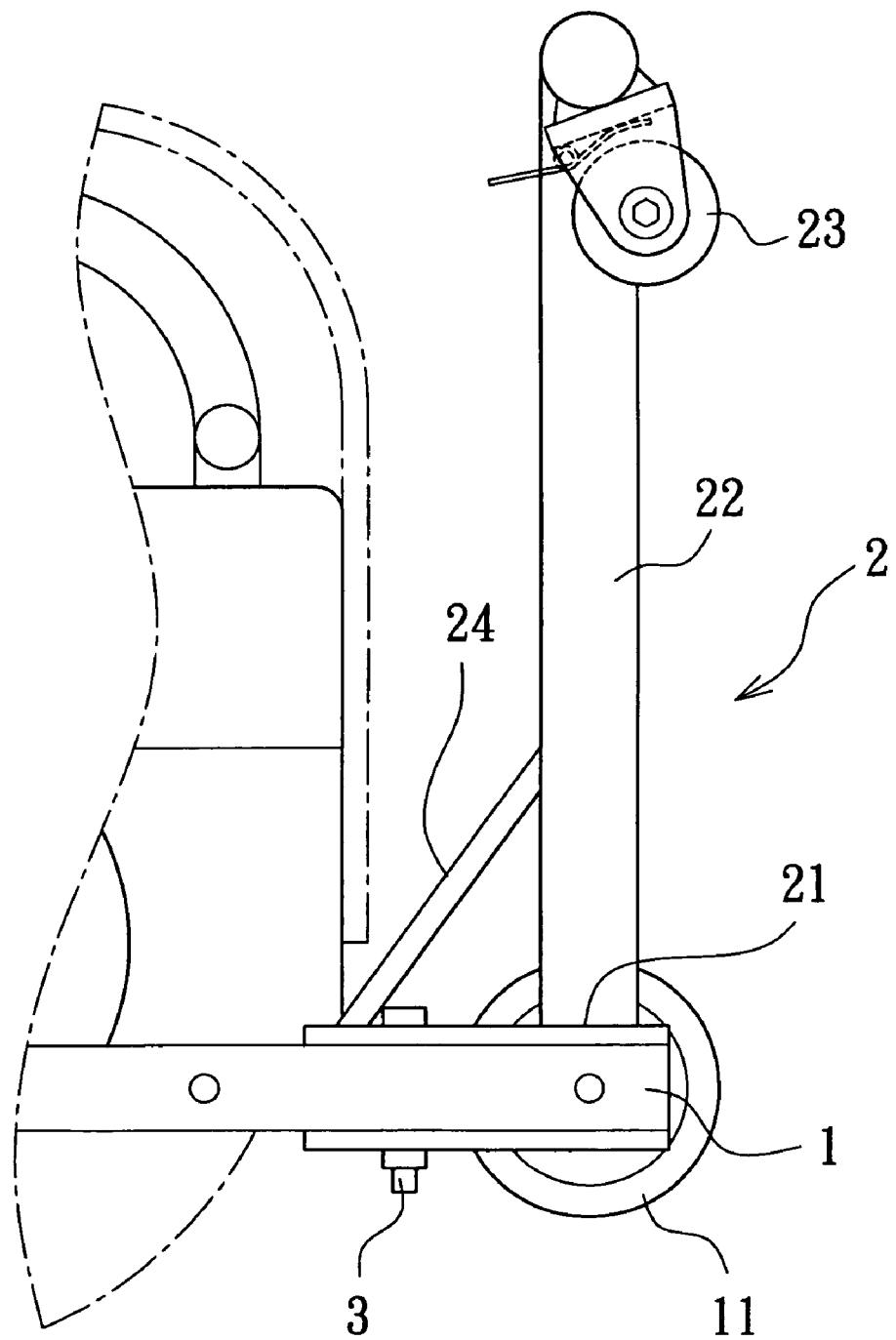
FIG. 3 is a partial side view of the present invention.

Referring to FIGS. 1 to 3, a preferred embodiment of an assistant stand mechanism 2 of a cart includes:

a pair of metallic angle plates 21 whose section is in the shape of an "L", including two parts, between which an angle exists; the metallic angle plates 21 are each screwed onto a respective one of a pair of rear lateral straight parts 1 of a cart chassis by means of threaded fixing elements 3, in an inverted position and closely touching both upper and inward sides of the rear lateral straight parts 1 of the cart chassis; further, an upper one of the two parts of each metallic angle plate 21 has the same width as the rear lateral straight parts 1, and a lower one has the same height as the rear lateral straight parts 1; furthermore, each of the rear lateral straight parts 1 of the cart chassis has a caster 11 fitted thereto;

a support rod 22 having a bending middle portion; the support rod 22 is securely connected to the upper parts of both the metallic angle plates 21 at two ends thereof such that the support rod 22 crosses the cart, and is normally perpendicular to the ground where the cart stands;

at least one caster 23 with a brake; the caster 23 is fitted to the support rod 22; and two sloping support rods 24; each of the sloping support rods 24 is connected to the support rod 22 at one end thereof, and connected to a corresponding metallic angle plate 21 at the other end.

Figure 4:
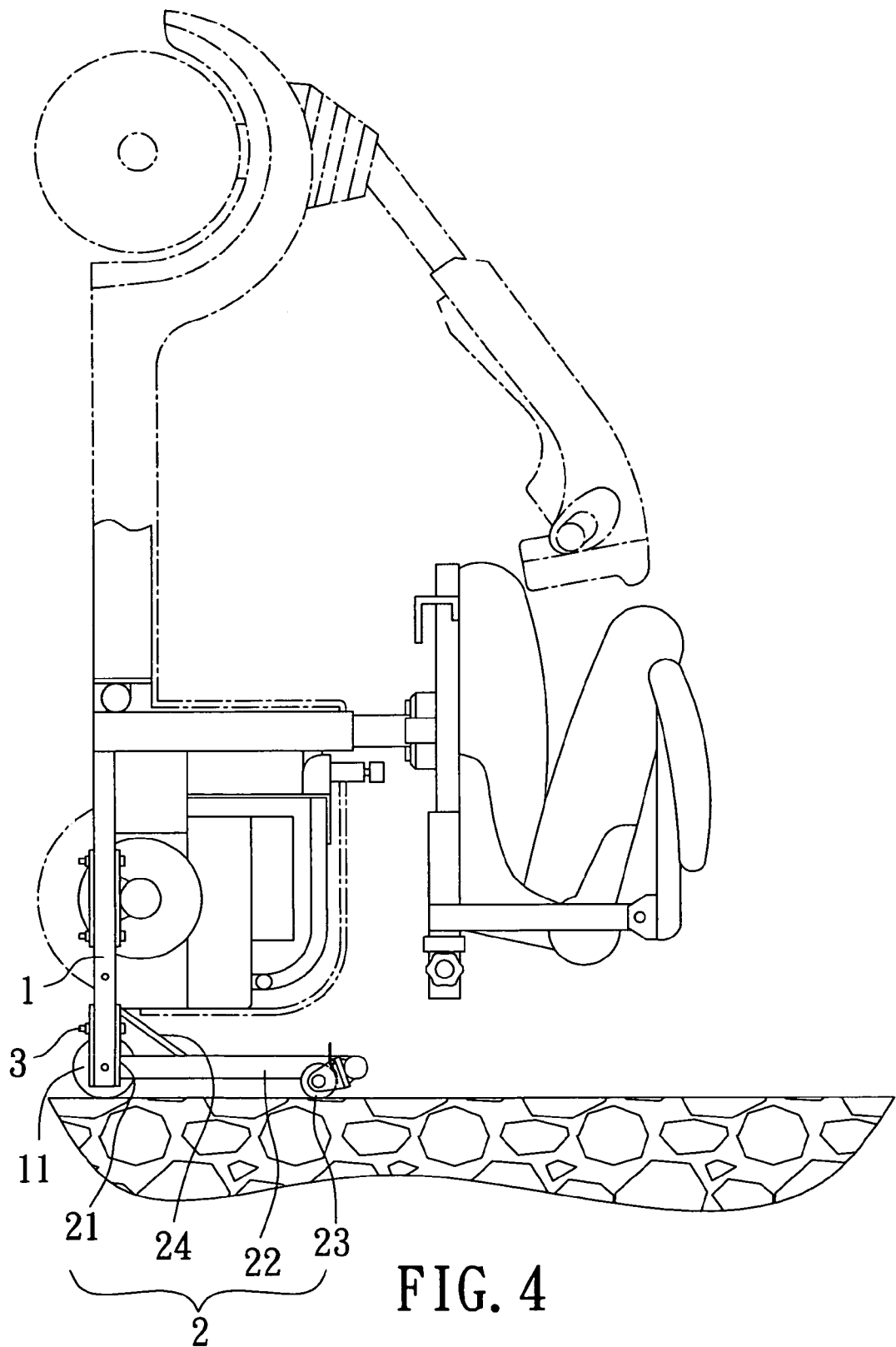
FIG. 4 is a side view of the cart of the present invention, standing on the assistant stand mechanism.

Therefore, when the cart isn't in use, people are allowed to lift the head of the cart so as to make the cart stand on the assistant stand mechanism with the chassis being in upright position and with the casters 11 and 23 touching the ground, making the cart occupy less area as shown in FIG. 4. Then, the cart with the chassis in upright position can be moved forwards and backwards with the help of the casters 11 and 23; the brake of the caster 23 is used to immobilize the caster 23 after the cart has been moved to a desired position, thus preventing the cart from moving. Because the sloping support rods 24 are securely connected to the metallic angle plates 21 and the support rod 22 at two ends thereof, the support rod 22 is prevented from changing shape when the cart is supported thereon.

From the above description, it can be easily seen that because of the assistant stand mechanism of the present invention, the cart is allowed to stand with the chassis in upright position so as to occupy less area, and with the casters touching the ground for the cart to be movable. Further, the cart can be immobilized with the brake of the caster fitted on the support rod when it stand on the casters with the chassis in upright position.

What is claimed is:

1. An assistant stand mechanism of a cart for people to ride on, comprising:

two casters each fitted to one of two rear lateral straight parts of a chassis of a cart;

a pair of metallic angle plates; the metallic angle plates being each screwed onto a respective one of the rear lateral straight parts of the cart chassis by means of threaded fixing elements, each of the metallic angle plates including two parts, between which an angle exists, and which respectively closely touch upper and inward sides of a corresponding rear lateral straight part of the cart chassis;

a support rod; the support rod being securely connected to the metallic angle plates at two ends thereof such that the support rod crosses the cart, and is substantially perpendicular to the ground where the cart stands;

at least one second caster fitted to the support rod; and two sloping support rods; each of the sloping support rods being connected to the support rod at one end thereof, and connected to a corresponding metallic angle plate at the other end thereof; whereby the cart is supported on the casters with the chassis in an upright position.

2. An assistant stand mechanism of a cart for people to ride on, comprising:

a chassis of a cart having two rear lateral straight parts;

two casters each fitted to one of the two rear lateral straight parts of the chassis;

a pair of metallic angle plates; the metallic angle plates being each screwed onto a respective one of the rear lateral straight parts of the cart chassis by means of threaded fixing elements, the metallic angle plates having an L-shaped cross-sectional contour, including two parts, between which an angle exists; one of the two parts of each metallic angle plate having a same width as the rear lateral straight parts of the cart chassis; the other one of the two parts of each metallic angle plate having a same height as the rear lateral straight parts a support rod; the support rod being securely connected to the metallic angle plates at two ends thereof such that the support rod crosses the cart, and is substantially perpendicular to a ground where the cart stands;

at least one second caster fitted to the support rod; and two sloping support rods; each of the sloping support rods being connected to the support rod at one end thereof, and connected to a corresponding metallic angle plate at the other end thereof; whereby the cart is supported on the casters with the chassis in an upright position.

3. The assistant stand mechanism of a cart for people to ride on as claimed in claim 1, wherein there is a single second caster fitted to the support rod.

4. The assistant stand mechanism of a cart for people to ride on as claimed in claim 3, wherein the second caster is equipped with a brake for immobilizing the cart when the cart stands with the chassis in said upright position.

5. The assistant stand mechanism of a cart for people to ride on as claimed in claim 1, wherein there are plural second casters fitted to the support rod.

6. The assistant stand mechanism of a cart for people to ride on as claimed in claim 5, wherein the plural second casters are equipped with a brake for immobilizing the cart when the cart stands with the chassis in said upright position.

7. The assistant stand mechanism of a cart for people to ride on as claimed in claim 1, wherein the second caster fitted to the support rod is equipped with a brake for immobilizing the cart when the cart stands with the chassis in said upright position.

\* \* \* \* \*